United States Patent [19]

Harrison

[11] Patent Number: 4,834,839

[45] Date of Patent: May 30, 1989

[54] ANGLE STATIONS IN OR FOR ENDLESS CONVEYOR BELTS

[75] Inventor: William Harrison, Stirling, United Kingdom

[73] Assignee: Anderson Strathclyde PLC, Glasgow, Scotland

[21] Appl. No.: 150,433

[22] Filed: Jan. 29, 1988

Related U.S. Application Data

[63] Continuation of Ser. No. 805,474, filed as PCT GB85/00145 on Apr. 2, 1985, published as WO85/04640 on Oct. 24, 1985, abandoned.

[30] Foreign Application Priority Data

Apr. 7, 1984 [GB] United Kingdom ................ 8409059

[51] Int. Cl.$^4$ .......................................... B65G 15/60
[52] U.S. Cl. ................................................ 198/839
[58] Field of Search ...................................... 198/839

[56] References Cited

U.S. PATENT DOCUMENTS

| | | | |
|---|---|---|---|
| 2,222,019 | 11/1940 | Buchanan | 198/839 |
| 2,798,590 | 7/1957 | Raskin | 198/839 |
| 2,873,021 | 2/1959 | McWhorter | 198/839 |
| 3,184,043 | 5/1965 | Gibbon | 198/839 |
| 4,655,340 | 4/1987 | Steel | 198/839 |

FOREIGN PATENT DOCUMENTS

| | | | |
|---|---|---|---|
| 1150662 | 7/1983 | Canada . | |
| 0109787 | 5/1984 | European Pat. Off. . | |
| 932415 | 8/1955 | Fed. Rep. of Germany | 198/839 |
| 2948290 | 6/1981 | Fed. Rep. of Germany | 198/839 |
| 709019 | 5/1954 | United Kingdom | 198/839 |
| 1048256 | 11/1966 | United Kingdom | 198/839 |

Primary Examiner—Robert J. Spar
Assistant Examiner—Cheryl L. Gastineau
Attorney, Agent, or Firm—Mason, Fenwick & Lawrence

[57] ABSTRACT

An angle station for an endless conveyor belt has an upper and a lower horizontal roller bank disposed in parallel with each other across a framework across the angle station. The angle of entry to the angle station of the upper run is co-linear with the exit of the lower return run. A reversing roller is associated with the lower bank to reverse the direction of the incoming return run before it passes over and around the lower roller bank and a reversing roller is associated with the upper bank to reverse the direction of the outgoing upper run of the belt after it has passed over and around the upper roller bank. The roller banks are interchangeably mountable on the framework to receive a right-handed or left-handed belt. Each roller bank comprises a stationary guide member mounted on a support bar removably mounted on the framework in one of two different attitudes for right and left-handed belts, and the stationary guide members being interchangeably mountable on the support bars for right and left-handed belts. Each stationary guide member has the shape of a major segment of a right circular cylinder with opening therein through which project an array of freely rotatable rollers disposed in a helical path and in an attitude to change the direction of the belt through an angle equal to the lesser angle of entry. Moreover, the pair of guide members have helical paths of opposite hand so the upper guide member for one hand becomes the lower guide member for the opposite hand.

6 Claims, 2 Drawing Sheets

ANGLE STATIONS IN OR FOR ENDLESS CONVEYOR BELTS

This application is a continuation of application Ser. No. 805,474, filed as PCT GB85/00145 on Apr. 2, 1985, published as WO85/04640 on Oct. 24, 1985, now abandoned.

BACKGROUND OF THE INVENTION

This invention relates to angle stations in or for endless conveyor belts.

An angle station has one horizontal upper and one horizontal lower roller bank around which an endless belt passes to change its direction on an upper material carrying run and on a lower return run.

In theory, the angle at which each roller bank lies in the station is normal to the line which bisects the individually related incoming and outgoing runs of the belt for each bank and therefore the roller banks would always lie normal to each other. For conveyor belts which enter and leave the station at 90° deflection, there is no problem regarding roller bank dimensions.

However, if the angle of deflection becomes obviously obtuse on the lower bank, this angle would be such as to require a bank of substantially increased length to accommodate the extra surface contact of the belt-wrap around the bank. In addition a lower bank of increased length would not permit interchangeability of the banks for 'handing' the units, i.e. altering the direction of entry of the upper run and consequently the co-linear direction of exit of the lower return run from one side of the station to the opposite side.

An object of the present invention therefore is to provide an angle station which allows for angles of entry of 90° and also practical obtuse angles, e.g. up to about 145°.

Another object of the invention is to provide an angle station which can accommodate a change in the angle of entry of the belt.

An angle station is known from Canadian Pat. No. 1 150 662 in which upper and lower parallel shell slide blocks (roller banks) can be changed angularly within limits, the shell slide block having legs which stand in horizontal arcuate slotted bars attached to the sides of a framework. Such an arrangement appears incapable of withstanding the forces likely to be exerted on the shell slide block by a loaded conveyor.

SUMMARY OF THE INVENTION

According to the present invention therefore, there is provided an angle station in or for an endless conveyor belt, having an upper and a lower horizontal roller bank disposed in parallel with each other across a framework of the angle station with their longitudinal axes normal to the bisector of the angle between the individually related incoming and outgoing runs of the belt for each bank for the intended angle of entry to the angle station of the upper run and co-linear exit of the lower return run, a reversing roller associated with the lower bank to reverse the direction of the incoming return run before it passes over and round the lower roller bank and a reversing roller associated with the upper bank to reverse the direction of the outgoing upper run of the belt after it has passed over and round the upper roller bank characterised in that the roller banks are interchangeably mountable on the framework to receive a right-handed or left-handed belt.

Preferably each roller bank comprises a stationary guide member mounted on a support bar said bar being mountable on the framework in two different attitudes for right and or left-handed belts, and the stationary guide members being interchangeably mountable on the support bars for right and left-handed belts.

Preferably also each stationary guide member has the shape of a major segment of a right circular cylinder with openings therein through which project an array of freely rotatable rollers disposed in a helical path and in an attitude to change the direction of the belt through an angle equal to the lesser angle of entry, the pair of guide members having helical paths of opposite hand so that the upper guide member for one hand becomes the lower guide member for the opposite hand.

An embodiment of the present invention will now be described, by way of example, with reference to the accompanying drawings.

BRIEF DESCRIPTON OF THE DRAWINGS

DETAILED DESCRIPTION OF THE INVENTION

Figure 2:
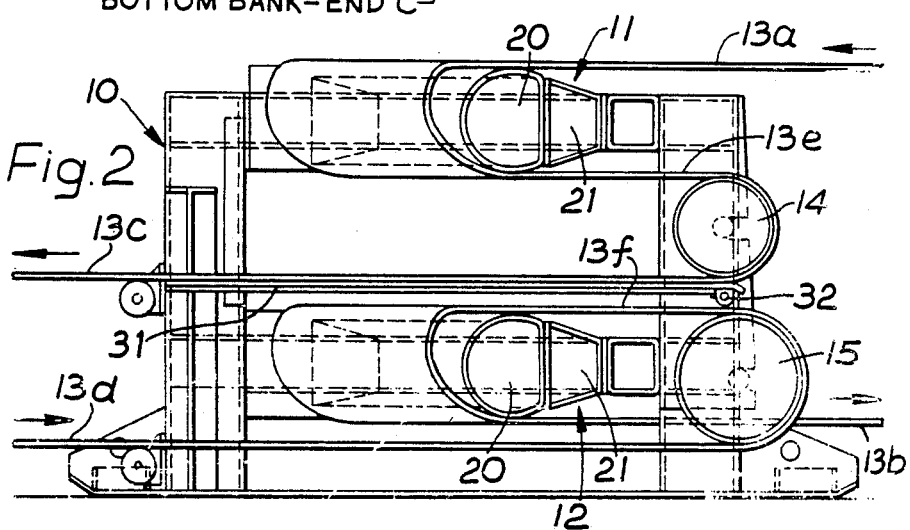
FIG. 2 is a side view of FIG. 1.

The angle station (see FIG. 2) includes a rectangular framework 10 which supports two roller banks 11, 12 around which an endless belt 13 passes as it enters and leaves the angle station (a) on an upper material-carrying run and (b) on a lower return run.

The roller banks 11, 12 (see FIG. 1) are disposed horizontally one above the other, i.e. parallel to each other, at an angle across the station and that angle 'X' is dependant on the angle 'Y' at which the upper incoming run enters at the side of angle station, the lower return run, as is usual, leaving the station below and co-linear with the incoming upper run.

The material-carrying run leaves the angle station at one end 13c (see FIG. 2), i.e. along the longitudinal axis of the station (and the lower incoming return run 13d is below and co-linear therewith); before doing so however, the outgoing upper run 13e of the belt moves in the reverse direction and around a reversing roller 14.

The angle (see FIG. 1) at which the upper run enters the side of the station can be 90° to the longitudinal axis of the station or an obtuse angle 'c' relative to the outgoing upper run of for example 120° or any other practical angle (hereinafter called the 'greater angle of entry').

Figure 1:
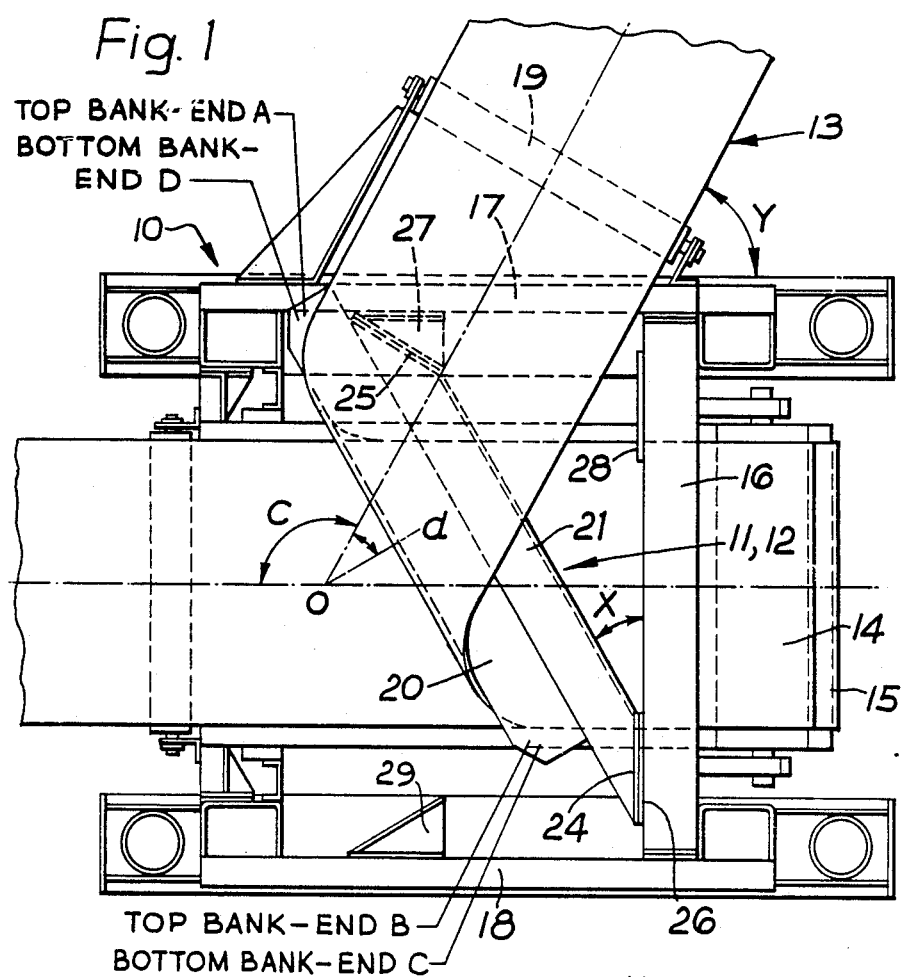
FIG. 1 is a plan view of an angle station according to the invention.

In the present embodiment, as illustrated in FIG. 1 the intended angle of entry relative to the incoming and initial outgoing runs 13a, 13e of the upper run (hereinafter called the 'lesser angle of entry') is 60° and the longitudinal axis of the upper roller bank lies normal to the bisector 'od' of that angle.

The lower roller bank 12 is below and parallel to the upper bank.

A reversing roller 15 is provided in association with the lower roller bank and is below the upper reversing roller 14. Thus, when the return run 13d enters the angle station it passes under and around the lower reversing roller 15 and reverses direction as run 13f before passing over and around the lower roller bank 12. It is the inclusion of this lower reversing roller 15 upstream of the lower roller bank 12 that allows the disposition of the lower roller bank to be below and parallel with the upper bank 11.

Figure 3:
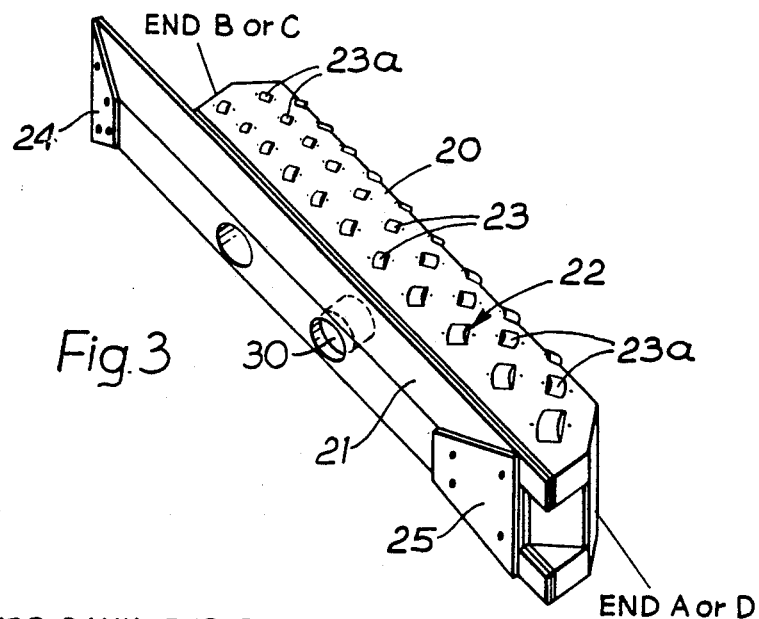
FIG. 3 illustrates a roller bank.

Each roller bank, of which one is illustrated in FIG. 3, comprises a stationary guide member 20 removably mounted on a support bar 21. The guide member 20 has the shape of a major segment of a right circular cylinder and with openings 22 therein through which project an array of freely rotatable rollers 23. The rollers are disposed in a helical path and in an attitude to change the direction of the belt passing over and around the roller bank through an angle equal to the lesser angle of entry, in this embodiment 60°. The ends 24, 25 of the support bar 21 are angled such that when the roller bank is located in the framework 10 of the angle station, the roller bank lies at the desired angle across the angle station, one end 24 being bolted to a seating 26 on an end frame 16 of the station framework 10 and the other end 25 being bolted to an angled bracket 27 on one side frame 17. A second seating 28 on the end frame 16 and bracket 29 on the opposite side frame 18 are also provided so that the support bar can be re-positioned for the opposite 'hand' (to be described hereinafter with reference to FIG. 4) with the bar end 25 bolted to seating 28 and bar end 24 bolted to bracket 29.

There are of course two seatings and two brackets for each support bar, the lower seatings and brackets being below those illustrated in FIGS. 1 and 4 of the drawings.

The technical details relating to the construction of the guide member 20 and rollers 23 of the roller bank is more fully explained in our European Patent application publication No. 0 109 787, corresponding to U.S. patent application Ser. No. 548,627.

The rollers 23a nearer the longitudinal ends of the array may be slightly out of axial symmetry with the other rollers 23 of the array to provide a toe-in attitude in relation to the line of run of the belt; this prevents the belt straying from its longitudinal path and is described in said European and U.S. applications.

Alternatively, and for the same purpose, the rollers of the array may be arranged at varying heights above the stationary guide member to provide a camber effect normal to the helical path.

Preferably a number of pairs of roller banks are provided, each pair to lie at a different angle from the others to accommodate different angles of entry of the upper run. Each pair of roller banks therefore have their rollers 23 positioned to turn the belt through the predetermined lesser angle of entry, and the ends 24, 25 correctly angled to set the rollers at their predetermined attitude across the station.

Angularly variable support rollers 19 are mounted on the side of the angle station to lie below the incoming upper and outgoing lower runs normal to the longitudinal axis of the belt.

The roller banks of each pair have helical paths of opposite 'hands'; thus, referring to the described embodiments the upper helical path receives the belt and turns it through 60° from 1 O'clock to 3 O'clock while the lower helical run turns the belt from 3 O'clock to 1 O'clock when viewed in FIG. 1.

Figure 4:
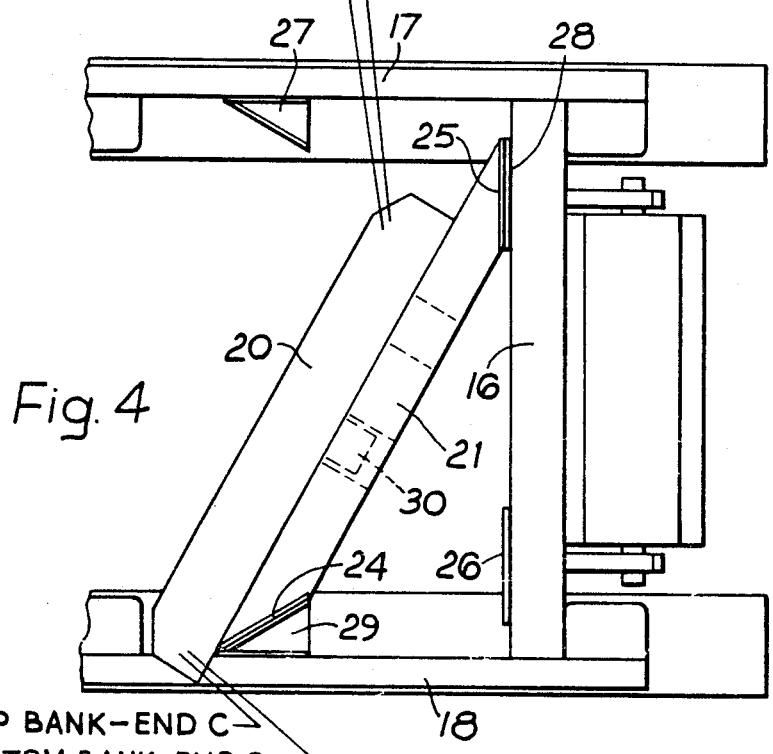
FIG. 4 illustrates the positioning of roller banks for the opposite 'hand' to FIG. 1.

Referring now to FIGS. 1 and 4 if it is desired to change the position of entry of the upper run (and consequently exit of the lower run) from one side of the angle station to the other, i.e. to change the 'hand' of the belt, the roller banks are re-positioned so that the upper one in the FIG. 1 embodiment becomes the lower one in the FIG. 4 embodiment; in addition the guide members 20 are adjusted longitudinally on their support bars 21 to accommodate the positioning of the belt. This is illustrated in FIGS. 1 and 4 where for the purpose of instruction, each guide member 20 is lettered at its ends AB and DC respectively. For the arrangement of the described embodiment the set up is as illustrated in FIG. 1; for a change of 'hand' the arrangement is as illustrated in FIG. 4.

To change the 'hand' from the FIG. 1 arrangement to the FIG. 4 arrangement, the guide members 20 are firstly removed from their support bars 21. Each support bar is then re-positioned, i.e. removed from seatings 26 and 27 FIG. 1 and bolted to seating 28 and 29 (FIG. 4).

The guide members 20 are then remounted, but this time with guide member AB lowermost and guide member DC uppermost; thus the guide members and support bars are interchangeable.

It will be noted that for the new 'hand', the ends A and D of the guide members are spaced back from the ends 25 of the support bars.

To enable the guide members to be correctly positioned on their support bars, a dowel 30 is mounted on the horizontal centre line of guide member 20 to locate in one of two holes in the support bar 21, (FIG. 4) after which the guide member is bolted to the bar.

The angle station includes an impact plate 31 between the upper and lower roller banks to prevent undue flexure of the belt 13 from material such as coal falling from the upper incoming run 13a on to the upper outgoing run 13c. The plate 31 is illustrated horizontal in FIG. 2 but it is capable of being pivoted at 32 for when the outgoing material-carrying run 13c exits from the angle station at an upward angle.

I claim:

1. An angle station for an endless conveyor belt having an upper and a lower horizontal roller bank disposed in parallel with each other across a framework of the angle station with their longitudinal axes normal to the bisector of the angle between the individually related incoming and outgoing runs of the belt for each bank for the intended lesser angle of entry to the angle station of the upper run and co-linear exit of the lower return run, a reversing roller associated with the lower bank to reverse the direction of the incoming return run before it passes over and around the lower roller bank, and a reversing roller associated with the upper bank to reverse the direction of the outgoing upper run of the belt after it has passed over and around the upper roller bank, each roller bank comprising a stationary guide member mounted on a support bar, each said support bar being mountable on the framework in two different attitudes for right- and for left-handed belts, and the guide members, when mounted on the respective support bars, being so disposed that the ends of the guide members remote from the side of the framework from which the belt enters are set back from the adjacent ends of the support bars while, the ends of the guide members adjacent the side of the framework from which the belt enters extend beyond the adjacent ends of the support bars to accommodate the helical path of the belt around the respective roller bank, and co-operating position-location means provided on the guide members and the support bars for correctly positioning each of the guide members in their set back disposition on the respective support bars at each change of hand thereby to correctly orient the roller banks with respect to each other, and each stationary guide member having the shape of a major segment of a right circular cylinder with openings therein through which project an array of freely rotatable rollers disposed in a helical path, the pair of guide members having helical paths of opposite hand and being vertically transposable while maintaining the same rotational disposition with respect to the longitudinal axes so that the upper guide member for one hand becomes the lower guide member for the opposite hand.

2. An angle station according to claim 1, wherein the guide members are removeably and interchangeably mountable on the support bars.

3. An angle station for an endless conveyor belt having an upper and a lower horizontal roller bank disposed in parallel with each other across a framework of the angle station with their longitudinal axes normal to the bisector of the angle between the individually related incoming and outgoing runs of the belt for each bank for the intended lesser angle of entry to the angle station of the upper run and colinear exit of the lower return run, a reversing roller associated with the lower bank to reverse the direction of the incoming return run before it passes over and around the lower roller bank, and a reversing roller associated with the upper bank to reverse the direction of the outgoing upper run of the belt after it has passed over and around the upper roller bank, each roller bank comprising a stationary guide member mounted on a support bar, said bar being mountable on the framework in two different attitudes for right- and for left-handed belts and each stationary guide member having the shape of a major segment of a right circular cylinder with openings therein through which project an array of freely rotatable rollers disposed on a helical path, the pair of guide members having helical paths of opposite hand and being vertically transposable while maintaining the same rotational disposition with respect to the longitudinal axes so that the upper guide member for one hand becomes the lower guide member for the opposite hand, said guide members being removably and interchangeably mountable on the support bars, each guide member having a dowel and each support bar having at least one hole into which the dowel is inserted, the hole being positioned to permit one end of the guide member to be set back from the adjacent end of the support bar, whereby in use, one end of each guide member is set back from the end of the respective support bar remote from the side of the framework from which the belt enters.

4. An angle station for an endless conveyor belt having an upper and a lower horizontal roller bank disposed in parallel with each other across a framework of the angle station with their longitudinal axes normal to the bisector of the angle between the individually related incoming and outgoing runs of the belt for each bank for the intended lesser angle of entry to the angle station of the upper run and colinear exit of the lower return run, a reversing roller associated with the lower bank to reverse the direction of the incoming return run before it passes over and around the lower roller bank, and a reversing roller associated with the upper bank to reverse the direction of the outgoing upper run of the belt after it has passed over and around the upper roller bank, each roller bank comprising a stationary guide member mounted on a support bar, each said support bar being mountable on the framework in two different attitudes for right- and for left-handed belts, the guide members, when mounted on the respective support bars, being so disposed that the ends of the guide members remote from the side of the framework from which the belt enters are set back from the adjacent end of the support bar to accommodate the helical path of the belt around the respective roller bank, each guide member having a dowel and each support bar having at least one hole into which the dowel is inserted for correctly positioning each of the guide members in their set back disposition on the respective support bar at each change of hand thereby to correctly orient the roller banks with respect to each other, and each stationary guide member having the shape of a major segment of a right circular cylinder with openings therein through which project an array of freely rotatable rollers disposed in a helical path, the pair of guide members having helical paths of opposite hand and being vertically transposable while maintaining the same rotational disposition with respect to the longitudinal axes so that the upper guide member for one hand becomes the lower guide member for the opposite hand.

5. An angle station according to claim 4, wherein the guide members are removably and interchangeably mountable on the support bars.

6. An angle station for an endless conveyor belt having an upper and a lower horizontal roller bank disposed in parallel with each other across a framework of the angle station with their longitudinal axes normal to the bisector of the angle between the individually related incoming and outgoing runs of the belt for each bank for the intended lesser angle of entry to the angle station of the upper run and co-linear exit of the lower return run, a reversing roller associated with the lower bank to reverse the direction of the incoming return run before it passes over and around the lower roller bank, and a reversing roller associated with the upper bank to reverse the direction of the outgoing upper run of the belt after it has passed over and around the upper roller bank, each roller bank comprising a stationary guide member mounted on a support bar, said bar being mountable on the framework in two different attitudes for right- and for left-handed belts and each stationary guide member having the shape of a major segment of a right circular cylinder with openings therein through which project an array of freely rotatable rollers disposed on a helical path, the pair of guide members having helical paths of opposite hand and being vertically transposable while maintaining the same rotational disposition with respect to the longitudinal axes so that the upper guide member for one hand becomes the lower guide member for the opposite hand, said guide members being removably and interchangeably mountable on the support bars, each support bar having two positions to receive a guide member, the positions being longitudinally spaced so that one end of the guide member can be set back from the adjacent end of the support bar, whereby in use, one end of each guide member is set back from the end of the respective support bar remote from the side of the framework from which the belt enters, and wherein each guide member has a dowel and each support bar has two holes into one of which the dowel is inserted to locate the guide member in the desired position.

* * * * *